Patented Apr. 21, 1931

1,801,375

UNITED STATES PATENT OFFICE

JOHANN JACOB FRIEDRICH STOCK, OF BERLIN, GERMANY

PROCESS FOR INCREASING THE RESISTABILITY OF PHOTOGRAPHIC EMULSION LAYERS

No Drawing.   Application filed April 5, 1930. Serial No. 442,039.

This invention relates to photographic films and aims to provide a finishing treatment of cinematographic films and the like so as to effect their resultant resistance to or protection against injury and defacement by scratching or otherwise. It is an embodiment of the concept or invention set forth in my prior and copending application Serial No. 72,395 of the same title, filed Nov. 30, 1925, of which this specification forms in part a continuation.

It is a recognized fact that photographic emulsion layers, especially those on cinematographic films, are highly susceptible to injury by scratching and other mechanical damages. To avoid such injuries, various kinds of so-called protective coatings have been applied to the emulsion side of the films in prior art practice. However, such coatings, usually comprising or embodying some kind of varnish, have not produced nor afforded the full protective results required and have soon cracked and scaled off the film.

In connection with cinematographic films, the damaging results and insufficiency of such coatings have been most noticeably felt, because in such films the thin layer of emulsion is carried upon a flexible base which is continuously subjected to pulling and bending strains. It is obvious also that the nearer the film is passed to the lamp of the projecting apparatus, the greater will be the heat affect upon the film and the sooner will it likely to be injured or destroyed.

The refractions of the rays of light caused by scratches occurring in the film naturally have an exceedingly disturbing effect upon the eye during projection, and the numerous scales or particles of hard cracked varnish sticking to the film during its passage through the projecting apparatus cause increased scratching and damage to the photographic film surface, so that the film is eventually spoiled or ruined entirely.

Because of these detrimental results or drawbacks, the application of such coatings has been largely dispensed with, particularly in the case of cinematographic negatives which are often of considerable value.

Other endeavors to frustrate the occurrence of mechanical damages to the photographic emulsion layers have been made by the introduction of hardening agents into the halogenous silver emulsion during the manufacture of the raw film. However, these endeavors have also met with failure since the addition of hardening agents greatly affected the photographic qualities of the emulsion and led to mechanical irregularities in the treatment of the film after exposure.

The present invention successfully solves the problem in a way entirely different from the above described prior art practice. It consists mainly in subjecting the emulsion layer—such as a gelatino-bromide emulsion—after developing, fixing and watering, to treatment with a suitable swelling agent such for example as acetic acid causing the layer to swell and become capable of absorbing certain substances brought into contact therewith. For the latter purpose, it is preferable to use colloidal substances such as will readily form complex colloidal compositions with the bromide or chloride gelatine in its swelled condition, and which, after concretion, will be almost insensitive to mechanical damages and yet retain its flexibility.

No swelling effect, however, will be obtained unless a strong or concentrated swelling solution is used, which should contain at least 15 to 20 per cent of acetic acid, formic acid, or any equivalent swelling agent and which would be able to dissolve both the layer of gelatin and the colloidal substance to be incorporated, as for example collodion shavings, nitro cellulose, or the like.

It has been found, that a solution of such strength adversely affects the material of the base upon which the gelatin layer is supported. The structure of the said material becomes distorted; the latter shrinks and the duration of life of the film depreciates to a marked extent. To avoid these ill effects, it has been found advisable to neutralize the said swelling solutions by the application of certain means, such as ammonia for example, which must of course be applied in a certain definite or at least approximate relation to the solution. An ammonia addition of from 6 to 8 percent has been found to be in advantageous proportion to a solution of approximately 20 to 30 percent of the swelling agent. The addition of water does not reduce the swelling action of the solution but, on the contrary, increases it materially; and it will be evident, that the stronger the swelling of the gelatin layer, the better will be the introduction of the colloidal substances of higher resistability into the numerous pores of the emulsion and their thorough combination into a homogeneous mass.

As an alternative and instead of adding ammonia to the solution, one may proceed as by saturating the solution by means of vapours of ammonia.

The application or employment of the aforesaid process is both simple and effective. The photographic emulsion of the film, which latter may be either a negative or a positive, is treated with a swelling agent such as a strong or concentrated solution of acetic acid, to which ammonia, or ammonia and water is added, until the emulsion has assumed a sufficiently swelled condition. Thereupon or in solution with the swelling agent, a colloidal substance, such for example as collodion or nitrocellulose, is incorporated which penetrates the emulsion layer clear through to its base and forms a colloidal composition with said emulsion. After its coagulation or concretion, this composition forms a completely homogeneous mass with the film which thereafter can neither crack nor scale and which is almost insensitive to any mechanical damages. In other words, the film emulsion is treated in a way to harden and render the same impervious to scratching or cracking upon redrying of the film without destroying its flexible properties.

In carrying the invention into effect the following proportions have been found to give good results and impart the desired strength and resistability to the film:

| | Parts |
|---|---|
| Collodion | 2 |
| Ether | 20 |
| Alcohol (spiritous) | 45 |
| Acetic acid | 20 |
| Phthalic acid | 2 |
| Ammonia 25% | 8 |
| Camphor | 3 |
| | 100 |

These proportions must be understood as given by way of example only and they may be varied in certain limits according to the nature of the emulsion and its quantitive proportions. The various ingredients may also be substituted by other equivalent means; thus for example acetic acid may wholly or partly be replaced by formic acid or some other equivalent.

Apart from the advantages enumerated above the process according to the invention provides for a considerably improved and more positive adhesion of the emulsion layer to or upon its base. Further, as the location of the silver particles in the emulsion is in no way affected, it is evident that the picture, whether positive or negative, remains entirely unaltered. A still further advantage lies in the fact that the film emulsion treatment according to this invention, imparts to the film an increased brilliancy which, in the case of cinematographic films, considerably improves the plastic appearance of the projected picture.

I wish it to be understood that, although I have hereinbefore described a definite example of my invention, I do not intend limiting myself to the said example, as I may vary the treatment of the emulsion within the scope of the appended claims to suit particular conditions or requirements. The essential and novel feature of the invention resides in the process of causing the photographic layer of the film to swell, and in such condition to absorb substances of a kind capable of forming compounds of high resistability of a protective character with the emulsion.

What I claim is:

1. The improved process of increasing the resistability of photographic or film emulsion layers, which consists in swelling the emulsion layer with a solution of acetic acid and ammonia after the photograph thereon has been finished, and incorporating with the emulsion layer thus swelled a cellulose ester which homogeneously pentrates the emulsion and combines therewith in a subsequently increased resistability when dry.

2. The improved process of increasing the resistability of photographic or film emulsion layers, which consists in swelling the emulsion layer with a concentrated solution of acetic acid and ammonia after the photograph thereon has been finished, and incorporting with the emulsion layer thus swelled a cellulose ester which homogeneously penetrates the emulsion and combines therewith in a subsequently increased resistability when dry.

3. The improved process of increasing the resistability of photographic or film emulsion layers, which consists in swelling the emulsion layer with a concentrated solution of acetic acid saturated with vapours of ammonia after the photograph thereon has been finished, and incorporating with the emulsion layer thus swelled a cellulose ester which homogeneously penetrates the emulsion and combines therewith in a subsequently increased resistability when dry.

4. The improved process of increasing the resistability of photographic or film emulsion layers, which consists in treating the emulsion layer with a solution of the following ingredients:

| | Parts |
|---|---|
| Collodion | 2 |
| Ether | 20 |
| Alcohol (spiritous) | 45 |
| Acetic acid | 20 |
| Phthalic acid | 2 |
| Ammonia 25% | 8 |
| Camphor | 3 |

In testimony whereof I affix my signature.
JOHANN JACOB FRIEDRICH STOCK.